Dec. 20, 1960  D. S. CLEVELAND  2,964,954
GYRO INTEGRATOR

Filed Oct. 19, 1959  2 Sheets-Sheet 1

INVENTOR.
DONALD S. CLEVELAND
BY Richard E. Horsley
HIS ATTORNEY

Dec. 20, 1960  D. S. CLEVELAND  2,964,954
GYRO INTEGRATOR
Filed Oct. 19, 1959  2 Sheets-Sheet 2
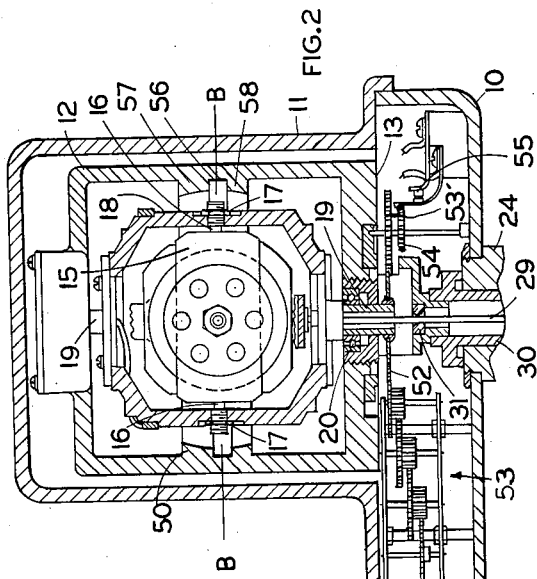
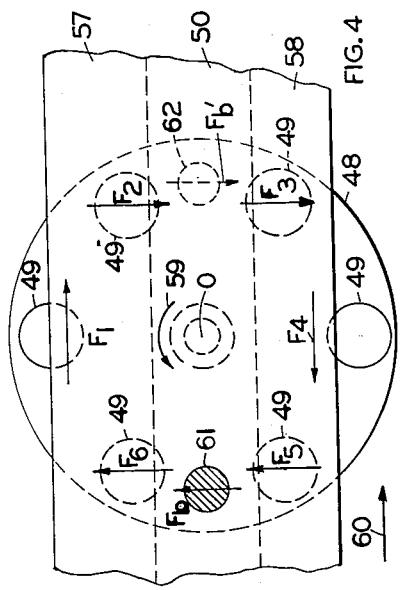
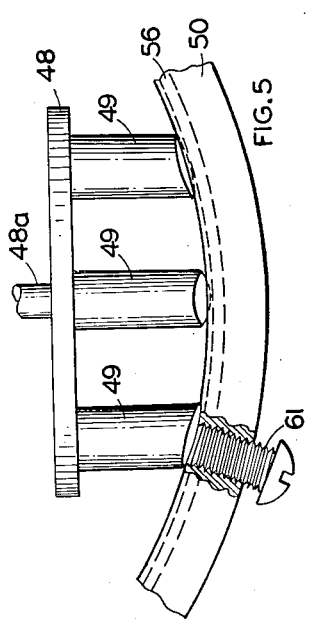
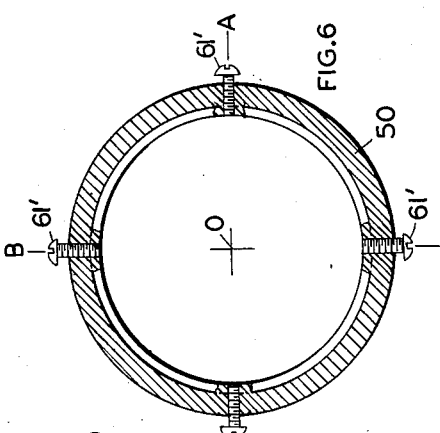
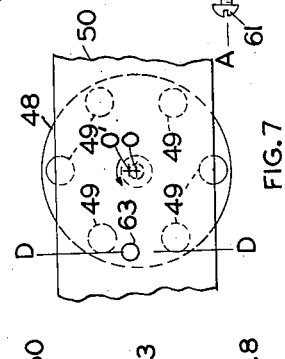
INVENTOR.
DONALD S. CLEVELAND
BY *Richard E. Horley*
HIS ATTORNEY

United States Patent Office 2,964,954
Patented Dec. 20, 1960

2,964,954
GYRO INTEGRATOR

Donald S. Cleveland, Beverly, Mass., assignor to General Electric Company, a corporation of New York Filed Oct. 19, 1959, Ser. No. 847,135

10 Claims. (Cl. 74—5.22)

The present invention relates to a gyroscopic device and more particularly to a gyro integrator of the type wherein a torque proportional to a quantity being measured is applied to a universally mounted gyroscope, causing precessional rotation of the gyroscope at a rate proportional to the quantity. The gyroscope is connected to drive a register to give an integrated output.

Gyro integrators of the type referred to above are especially useful in obtaining an integrated output of mass rate flowmeters of the type disclosed in Jennings Patent 2,714,310. One such application having unique compensation features is disclosed in my copending application, Serial No. 639,976, filed February 13, 1957, now Patent No. 2,914,945, issued December 1, 1959, which is assigned to the same assignee as the present invention.

In use of gyro integrators, an error may arise if a torque is applied to the gyroscope when the value of the quantity being measured is zero. This can occur because of spurious signal torques generated in the instrument used to measure the quantity being integrated. For example, in mass rate flowmeters of the type disclosed in the Jennings patent, there may be a small torque, causing slight deflection of the turbine element under zero flow conditions when the instrument is filled with fluid due to viscous coupling between the rotating impeller and the stationary turbine. If this torque is transmitted to a gyro integrator, there may develop a cumulative error of considerable magnitude under special conditions of operation where the instrument operates under zero flow conditions for extended periods of time.

Accordingly, it is an object of my invention to provide a gyro integrator having means for preventing error due to spurious torques developed in the system for measuring the quantity being integrated.

A further object is to provide a gyro integrator, the accuracy of which is not impaired by the load torque imposed on the gyro by the connected register mechanism.

A still further object is to provide a gyro integrator which is reliable, relatively inexpensive to construct, and which is not subject to errors previously encountered with devices of this type.

Other objects and advantages of my invention will become apparent as the following description proceeds.

Briefly, in accordance with one aspect of my invention, I provide a gyro integrator having means to apply to a universally mounted gyro a signal torque proportional to the quantity being integrated to precess the gyro about its major axis. A detent arrangement associated with the eddy current leveling system of the gyro is arranged to develop a torque about the minor gyro axis in opposition to the signal torque at a predetermined position of the gyro. This prevents precession of the gyro and the connected register until the signal torque exceeds a predetermined value. By selecting this value to be greater than the value of spurious signal torques likely to be encountered, cumulative error due to spurious torques is prevented. The arrangement is such that, once the signal torque is sufficient to overcome the holding torque of the detent, the effect of the detent torque, which becomes alternately positive and negative, cancels out and hence does not appear in the integrated output of the measured quantity. In addition, a unique arrangement also associated with the eddy current leveling system of the gyro is provided for developing a torque which counterbalances the friction torque imposed on the gyro by the register mechanism without impairing the accuracy of the gyro.

For a more detailed description of the present invention, reference should now be made to the following description taken in connection with the accompanying drawings in which:

Fig. 2 is a front view of the gyro integrator shown in Fig. 1;

Fig. 4 is a side view of the eddy current mechanism providing leveling and holding torques supplied to the gyroscope;

Fig. 5 is a top view of the mechanism shown in Fig. 4;

Fig. 6 is a top sectional view of the eddy current conductor member forming a part of the gyroscope leveling system;

Fig. 7 shows a modified arrangement of the eddy current conductor member; and

Fig. 8 is a sectional view of the conductor member along the line D—D of Fig. 7.

Figures 1, 3:
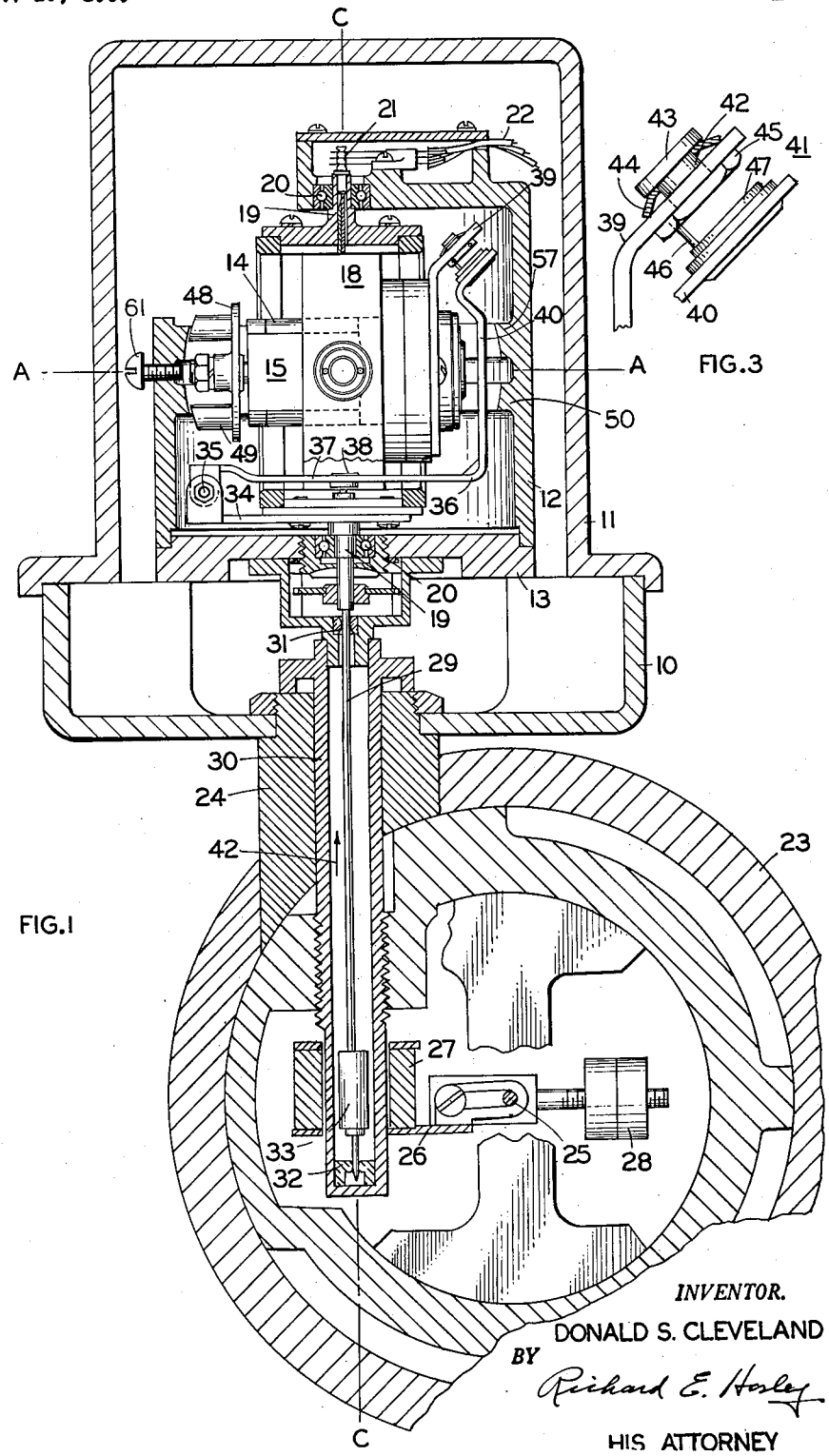
Fig. 1 is a side view partly in section of a gyro integrator embodying the invention, the integrator being shown as mounted on and actuated by an associated mass flowmeter.
Fig. 3 is an enlarged view showing a detail of an adjustment mechanism forming a part of the gyroscope torque input linkage.

Referring now to the drawings, and particularly to Fig. 1, there is disclosed a gyro integrator which in the illustrated embodiment is shown as being supported on and actuated by a mass flowmeter. The integrator is supported on a base member 10 carrying a casing 11 which encloses the gyroscope mechanism. The integrator comprises a universally supported gyroscope mounted on a support 12 carried by a base plate 13 which is in turn mounted on the base member 10. The gyroscope comprises a rotor 14 having a normally horizontal spin axis extending in the direction of axis A—A. The rotor is supported by a frame 15 having trunnions 16 supported by bearings 17 which permit rotation of the rotor frame about the minor axis of the gyroscope B—B. The bearings 17 are carried by a gyro gimbal 18 having vertically disposed trunnions 19 supported by bearings 19 permitting the gimbal to rotate about the vertical major axis C—C of the gyroscope. As is customary with universally mounted gyroscopes, the gyro spin axis A—A, the minor axis B—B, and the major axis C—C all intersect at a common point O at the center of the gyroscope known as the center of suspension.

The gyro rotor is preferably constructed of a heavy material such as tungsten so as to have high inertia, and the rotor is driven at high speed by suitable driving means, usually in the form of an electric motor. The details of the motor are omitted for clarity since the construction thus far described is conventional and well known. The power is supplied to the motor through slip rings 21 on major axis trunnion which are connected to suitable power leads shown at 22.

The gyro integrator operates on the principle that a torque applied about the minor axis of the gyroscope causes the gyroscope to precess about the major axis in accordance with the well-known law of gyroscopic precession. The integrator makes use of the fact that the rate of gyro precession is proportional to the precessing torque applied to the gyro. A signal torque variable in accordance with the quantity to be integrated is applied about the minor axis of the gyroscope which causes the precessional rotation about the major axis at a rate variable with the input signal torque. In order to obtain an integrated output the precessional rotation of the gyroscope drives a suitable register mechanism which can be calibrated to read integrated output of the quantity being measured.

While the gyro integrator forming the present invention may be used with any sensing device, there is shown for the purpose of illustration, an arrangement in which the input signal torque is taken from the output of a mass flowmeter of the type disclosed in the above-mentioned Jennings patent and my copending application, Serial No. 639,976, filed February 13, 1957, now Patent No. 2,914,945. The complete mass flowmeter is not shown since it forms no part of the present invention. However, it will be understood that the mass flowmeter may consist of two cylindrical elements, an impeller and a turbine, axially arranged in the stream of a fluid, the mass of which is to be measured. Both elements contain channels through which the fluid flows. The impeller is driven at a constant speed by a synchronous motor and imparts angular velocity to the fluid as it flows through the motor. The value of this angular momentum added to the fluid is proportional to the mass rate of flow. The turbine, which is located downstream from the impeller, removes all of the angular momentum from the fluid and, in so doing, receives a torque proportional to the angular momentum and the mass rate of the flow. It is this torque that is used as the input torque to the gyro integrator in the illustrated embodiment of the invention.

The part of the mass flowmeter shown in Fig. 1 of the drawing comprises a cylindrical casing 23 carrying an upstanding support 24 on which the base member 10 of the gyro integrator is mounted. The turbine of the flowmeter which experiences the input torque proportional to the quantity (mass flow rate) being measured is carried on a shaft 25 extending in the direction of the axis of the cylindrical casing 23. This shaft 25 carries a rocker arm 26 supporting on one end a cylindrical magnet 27 and at the other end an adjustable counterbalance weight 28. Torque is transmitted from the turbine shaft 25 to the gyro integrator through a force rod 29 enclosed in a nonmagnetic tube 30 extending through support 24.

As best shown in Fig. 2, the upper end of the force rod 29 extends through the lower trunnion 19 of the gyro, which is hollow, and is supported by suitable bearings 31 and 32 so as to permit axial movement of the rod.

Torque from the turbine shaft 25 is transmitted to the lower end of the force rod 29 by means of a magnetic coupling comprising a magnet 33 attached to the force rod which coacts with the cylindrical magnet 27 carried on the rocker arm 26. It will be understood that, as the turbine shaft 25 rotates clockwise slightly in response to an increase in the flow rate, the magnet 27 moves upward with respect to the tube 30. The magnet 33 follows and carries with it the force rod 29.

The torque developed by the flowmeter turbine and transmitted through the force rod 29 is applied to the gyroscope as an input torque by an adjustable mechanism which will now be described. As best seen in Fig. 1, there is attached to the lower end of the gimbal 18, and rotatable therewith, a supporting arm 34 on which is mounted for rotation about a pivot 35 an L-shaped lever 36. The lever 36 has a horizontal arm 37 the outer end of which is connected to the support 34 through the pivot 35. The central part of the arm 37 carries a bearing member 38 against which the upper end of the force rod 29 abuts so that the vertical movement of the force rod causes a counterclockwise rotation of the lever.

Extending from the rotor frame 15 is an arm 39 which is engaged by an upstanding arm 40 forming a part of the L-shaped lever 36 through a low-friction, adjustable pivot indicated generally at 41. As best shown in Fig. 3 of the drawing, this adjustable pivot comprises stud 42, extending through an aperture in the end of lever 39, the stud having at its outer end a retaining head 43 which is held in position by a spring friction washer 44. The other end of the stud has an enlarged hexagonal head 45 in one side of which is inserted an adjustable pivot pin 46. This pin bears against a bearing plate 47 carried at the outer extremity of lever arm 40. By rotating the stud 42, the position of the pivot pin may be adjusted radially with respect to pivot 35 so as to vary the effective length of the lever arm extending between the pivot pin and the pivot 35. In this manner, the torque applied to the gyro relative to the torque developed by the flowmeter may be adjusted in order to calibrate the integrator.

In order to maintain the desired relationship between the input torque applied to the gyroscope and the resulting precessional rotation, it is important that the spin axis A—A of the gyro be maintained continuously in a position in which it is approximately normal to the major axis C—C. To accomplish this, there is provided an eddy current leveling system of the same general type as that disclosed and claimed in Patent 2,585,693 Sinks et al. which is assigned to the same assignee as the present invention. This leveling system comprises basically a magnet arrangement carried by the gyroscope to produce a rotating magnetic field and a relatively fixed conductor member disposed in inductive relation to the rotating magnetic field so as to impose eddy current drag torques on the gyro to maintain it in a level position. In the illustrated embodiment of the invention, the means for producing the rotating magnetic field comprises a circular disk 48, preferably formed of magnetic material carried on the end of a shaft extension 48a of the gyro rotor. Affixed to and projecting outwardly from the disk 48 are a series of cylindrical permanent magnets 49 which produce a magnetic field projecting outwardly from the gyro rotor. Since the disk 48 rotates with the rotor, the magnets produce a rotating magnetic field, the axis of which is coincident with the spin axis of the gyro. The magnets are preferably magnetized so that the outer ends of adjacent magnets have opposite polarity to create a symmetrical, high-intensity magnetic field.

Disposed in inductive relation to the magnetic field produced by the magnets is a relatively fixed, cylindrical conductor member 50 formed of a suitable electrical conducting material, such as aluminum, which in the illustrated arrangement is formed integrally with the support member 12, the arrangement being such that the axis of the conductor member is coincident with the major axis C—C of the gyro. Preferably, the surface of the conductor member adjacent the rotating magnets is ground with a spherical surface which matches a complementary spherical surface ground on the end of the magnets so as to maintain close clearance and a resulting high flux density for various positions of the gyro rotor relative to the conductor. It will be understood that, as the magnets 49 rotate, the magnetic flux therefrom sweeps the conductor member so as to cause generation of the eddy currents in the conductor member. The rotating magnets and the coacting conductor member form an eddy current leveling system, the function of which is to maintain the spin axis A—A of the gyroscope in the position in which it is perpendicular to the gyro major axis C—C and also, in accordance with one aspect of the present invention, to provide a torque on the gyroscope in the level position which counterbalances the torque load of the register mechanism which will now be described.

To totalize the precessional rotation of the gyro about its major axis, there is provided a register mechanism of the cyclometer type indicated generally at 51. This register mechanism is driven by means of a trunnion gear 52 attached to the lower, hollow trunnion 19 which drives the register through a series of spur gears forming a reduction gear train 53. The trunnion gear 52 may also drive another gear 53' and a connected cam 54 which operates to open and close a switch 55 which may, through appropriate electric circuit connections not shown, operate remote totalizers, registers, ticket printers, etc.

It will be appreciated that the register 51 and any other mechanism driven by the gyro, such as the intermittent switch 55, imposes a load torque on the gyro about the major axis which would cause tilting of the gyro rotor about its minor axis if it were not for the action of the leveling system.

The action of the leveling system in preventing tilting of the gyro axis is best understood by reference to Fig. 4 of the drawing. In the arrangement shown, the permanent magnets sweep past the conductor member, causing eddy currents to flow therein; and these currents in turn produce drag torques which react on the gyroscope. If each of the magnets sweeps the same area of the conductor member on opposite sides of the axis of rotation, the drag torques will all be symmetrical and the net effect on the gyro will be zero. If, however, the areas swept are not equal so that these drag torques are dissymmetrical, there will be a net drag torque exerted on the gyro, the direction of which will depend on the algebraic sum of the torques developed by the individual magnets. As pointed out, in order to maintain an accuracy of the gyro integrator, the spin axis of the gyroscope should be maintained normal to the major axis. However, the friction torque of the register and switch mechanisms plus the frictional torque from the bearings will cause the spin axis of the gyro to tilt until an equal and opposite torque about the minor axis is developed by the leveling system of the gyro. If the conductor ring is symmetrical in construction and disposed so that its center is coincident with the center of suspension of the gyroscope, the system will come into equilibrium in some position in which the gyro spin axis is tilted with respect to the major axis and this tends to impair the accuracy of the gyro as pointed out above. In accordance with one aspect of the present invention, this tilting of the gyro spin axis is precluded by a compensating arrangement built into the eddy current leveling system, as will now be explained.

Preferably, the conductor member 50 has a groove 56 which separates the conductor member into two ring-shaped sections 57 and 58 which lie close to the outer extremities of the rotating magnets 49 and therefore are in areas of high flux density so that there is maximum generation of eddy currents in these sections. The groove 56 removes the intermediate section of the conductor member from the region of high flux density so that this area is not effective in the production of eddy current drag torques; and in this way, load imposed by the drag torques on the gyro motor is reduced. In order to cause the leveling system to develop a torque which counterbalances the load torque imposed by the register mechanism and other devices driven by the gyro, it will be noted that the upper section 57 of the conductor member is made wider than the lower section 58 since in the arrangement shown the conductor member 50 is symmetrically disposed with respect to the center of suspension of the gyro. The effect of having sections 57 and 58 of different widths is to cause the leveling system to develop a net drag torque about the major axis of the gyroscope when the spin axis is in the level position shown in the drawing. This will be apparent by reference to the area swept by the upper and lower magnets 49. Thus it will be noted that the area swept by upper magnet, which is moving to the left for the direction of gyro rotation indicated by the arrow 59, is greater than the area swept by the lower magnet. This means that the corresponding drag forces $F_1$ and $F_4$ are unbalanced, giving a resultant force to the right as viewed in Fig. 4. The horizontal components of the forces developed by the remaining magnets 49 which are between the upper and lower magnets are symmetrical and balance out so that these forces have no effect in producing torque about the major axis. Thus the resultant of the forces $F_1$ and $F_4$ which is to the right is in a direction to counterbalance the load imposed by the register mechanism which is in the opposite direction since, in the arrangement illustrated, the gyroscope precesses in a counterclockwise direction as viewed from the top in response to a signal torque from the flowmeter as indicated by the arrow 60. If the gyro spin axis should depart from the level position indicated in a direction to cause the magnet disk 48 to rise as viewed in Fig. 4, it will be apparent that the force $F_1$ will decrease and the force $F_4$ will increase so that the resultant force is to the left which is in a direction to cause the spin axis of the gyro to precess back toward the level position. It will be apparent also that, if the disk 48 moves downwardly, the reverse action will take place so that the eddy current leveling system acts at all times to maintain the spin axis of the gyro level. Thus, in accordance with this aspect of the invention, the eddy current leveling system not only acts to maintain the spin axis of the gyro level but also acts to produce in the level position of the spin axis a torque which is in a direction to counterbalance the drag torque imposed by the register mechanism.

In the illustrated arrangement just described, the conductor member 50 is symmetrically located with respect to the center of suspension O of the gyroscope and the unbalanced torque about the major axis which counterbalances the load torque of the register is developed by making the sections 57 and 58 of the conductor member of unequal axial lengths. A similar effect may be obtained with a modified arrangement shown in Figs. 7 and 8 of the drawing. Here it will be noted that the inner surface of the conductor has a smooth spherical contour, the groove 56 having been eliminated, and that the center O' of the conductor member 50 is displaced upwardly a small amount from the center of suspension O of the gyroscope in the direction of the major axis to obtain the desired torque bias. This arrangement will similarly cause the upper magnets to sweep a greater area of the conductor member than the lower magnets so that a counterbalancing torque is developed when the gyroscope spin axis is in a level position in which it is normal to the major axis.

If a torque is applied about the minor axis of the gyroscope when the quantity being measured is zero, it is apparent that, if the action is not prevented, the gyro will continue to precess at a slow rate and thus give an erroneous indication. For example, in the case illustrated of the mass flowmeter, a spurious signal torque may be applied to the gyro under zero flow conditions because of viscous coupling between the impeller and turbine elements which results in a delivery of a small torque output through the force rod 29 and the connected linkage to the gyro. In accordance with another aspect of the present invention, this type of error is prevented by the provision of a detent arrangement which generates a holding torque and prevents creep of the gyroscope about its major spin axis until the signal torque reaches a sufficient value to overcome the locking torque as will now be described.

To provide a detent action, giving the desired holding or locking torque, there is provided a simple and yet effective arrangement associated with the eddy current leveling system which acts to produce dissymmetry in the pattern of the eddy currents developed in the conductor member 50. This is accomplished by the provision of a magnetic insert or plug 61 which may take the form of a screw threaded into the conductor member 50, preferably in the groove 56 between the sections 57 and 58. This plug may, for example, be an ordinary machine screw formed of hardened steel which forms a low reluctance path for the magnetic flux emanating from the magnets 49 when the gyro rotor is positioned about the major axis so as to bring the rotating magnets and the screw into juxtaposition. The fact that the screw provides a low reluctance magnetic path as compared to the surrounding nonmagnetic material results in a dissymmetry in the production of eddy currents in the region of the screw. This in turn causes an unbalance in the vertical components of the drag torques imposed on the gyro as will be apparent by reference to Fig. 4 of the drawing. Thus it will be noted that, while the forces $F_2$ and $F_3$ are equal and opposite to the forces $F_5$ and $F_6$ which are produced by the magnets intermediate the upper and lower magnets, there is in addition an unbalancing force $F_b$ in a vertical direction produced by passage of the magnets in close proximity to the screw 61 when moving in an upward direction. It will be noted that there is no counterbalancing force when the magnets move in a downward direction so that an unbalanced condition exists. The direction of the force $F_b$ is such that a torque is produced on the gyroscope tending to cause the magnetic disk to move to the left as indicated in Fig. 4 whereas the normal direction of precession caused by application of signal torques is to the right as indicated by the arrow 60. Thus, the precession of the gyro will be stopped at this point until such time as the signal torque applied through the force rod 29 and the connecting linkage exceeds the holding torque developed by screw 61. The value of this holding torque which may be varied by radial adjustment of the screw is selected at a value somewhat greater than the spurious torques likely to be delivered by the flowmeter under zero flow conditions. In this way, rotation of the gyro and the connected register mechanism in response to spurious signal torques is prevented. An important advantage of this arrangement is that the holding torque does not cause erroneous indication once the signal torque has sufficient magnitude to overcome the holding torque so that the gyroscope precesses continuously. The reason for this is the fact that, when the gyro rotates to a position in which the screw 61 is opposite the descending rather than the ascending magnets as indicated by the dotted circle 62, the unbalanced drag torque indicated by arrow $F_b'$ is in the downward direction and hence provides an accelerating torque which is equal and opposite to the holding torque developed in the holding position. Thus, the unbalanced torques developed by the screw 61 are alternately positive and negative as the gyro rotates so that the net effect on the integrated output is zero.

For some applications, it may be desirable to provide the detent action for more than one position about the major axis of the gyro. In accordance with the present invention, this may be easily accomplished by the arrangement shown in Fig. 6 wherein a plurality of additional screws 61' are disposed about the periphery of conductor member 50. With this arrangement, there will be a holding or detent action at each position where the rotating magnets come into juxtaposition with one of the screws.

As will be understood by those skilled in the art, other arrangements may be used to produce dissymmetry in the eddy current drag torques produced by the screw 61 in the conductor member 50. Thus the dissymmetry may be produced by merely drilling a hole, such as is indicated at 63 in Figs. 7 and 8, in the conductor member opposite the path of magnets 49 in a location where the holding torque is desired. Alternatively, the insert or plug may be of a nonmagnetic material having conductivity different from that of the adjacent material.

While there are shown and described particularly embodiments of the invention, it will occur to those skilled in the art that various changes and modifications may be made without departing from the invention; and it is therefore intended in the appended claims to cover all such changes and modifications as fall within the true spirit and scope of the invention.

What I claim as new and desire to secure by Letters Patent of the United States is:

1. A gyroscopic integrating device comprising a gyroscope having a rotor supported in a frame and a gimbal supporting said frame for rotation about a minor axis perpendicular to the rotor spin axis, a support mounting said gimbal for rotation about a major axis perpendicular to said minor axis, input means applying a variable signal torque to said gyroscope about said minor axis to cause precession about said major axis, output means actuated by rotation of said gyro about its major axis, and detent means preventing precession of said gyroscope about said major axis until said signal torque exceeds a predetermined value.

2. A gyroscopic integrating device comprising a gyroscope having a rotor supported in a frame and a gimbal supporting said frame for rotation about a minor axis perpendicular to the rotor spin axis, a support mounting said gimbal for rotation about a major axis perepndicular to said minor axis, input means for applying a variable signal torque to said gyroscope about said minor axis to cause precession about said major axis, output means actuated by rotation of said gyro about its major axis for controlling a register, detent means preventing precession of said gyroscope about said major axis until said signal torque exceeds a predetermined value, said detent means comprising means supported by said frame producing a rotating magnetic field, a relatively fixed conductor member disposed in inductive relation with said field so that eddy currents are produced therein and drag torques exerted on said gyro, and means associated with said conductor member creating dissymmetry in the pattern of flow of eddy currents therein to produce a net drag torque on said gyroscope about said minor axis.

3. The combination as defined in claim 2 in which the conductor member is in the form of a cylinder concentric with the major axis of the gyroscope acting to position the gyroscope spin axis relative to the major axis, and the means for creating dissymmetry in the pattern of eddy currents induced in the conductor member is a magnetic insert forming a part of the conductor member and disposed in inductive relation to said field.

4. The combination as defined in claim 2 in which the conductor member is cylindrical and concentric with the major axis of the gyroscope, and the means for creating dissymmetry in the pattern of flow of eddy currents induced in the conductor member is a screw formed of magnetic material and threaded into said conductor member so as to be adjustable relative to said rotating magnetic field.

5. A gyroscopic integrating device comprising a gyroscope rotor supported by a gimbal for movement about a minor axis perpendicular to the spin axis of the rotor and about a major axis perpendicular to said minor axis, input means for applying a signal torque about said minor axis to cause said gyroscope to precess about its major axis, a register driven in accordance with precessional movement of said gyroscope, magnetic means driven by said rotor to produce a rotating magnetic field concentric with said spin axis, a relatively fixed, cylindrical conductor member concentric with said major axis and arranged in inductive relation with said field to produce eddy current drag torques about said major axis to position said gyro rotor relative to said major axis, and means associated with said conductor member creating dissymmetry in the flow of eddy currents therein to produce a net drag torque on said gyroscope about its minor axis in opposition to said signal torque.

6. A gyroscopic integrating device comprising a gyroscope rotor supported by a gimbal for movement about a minor axis perpendicular to the spin axis of the rotor and about a major axis perpendicular to said minor axis, said axes intersecting at a center of suspension, input means for applying a signal torque about said minor axis to cause said gyroscope to precess about its major axis, a register driven in accordance with precessional movement of said gyroscope, magnetic means driven by said rotor to produce a rotating magnetic field concentric with said spin axis, a relatively fixed, cylindrical conductor member concentric with said major axis and arranged in inductive relation with said field to produce eddy current drag torques about said major axis to position said gyroscope rotor relative to said major axis, said conductor member being constructed and arranged relative to the center of suspension of the gyroscope so that when the spin axis of the gyroscope is perpendicular to the major axis a net eddy current drag torque is produced about the major axis in a direction to counterbalance the friction drag torque imposed on the gyroscope by the register.

7. A gyroscopic integrating device comprising a gyroscope rotor supported by a gimbal for movement about a minor axis perpendicular to the spin axis of the rotor and about a major axis perpendicular to said minor axis, input means for applying a signal torque about said minor axis to cause said gyroscope to precess about its major axis, a register driven in accordance with precessional movement of said gyroscope, magnetic means driven by said rotor to produce a rotating magnetic field concentric with said spin axis, and a relatively fixed cylindrical conductor member concentric with said major axis and arranged in inductive relation with said field to produce eddy current drag torques about said major axis, said conductor member being formed to provide two concentric, spaced, ring-shaped sections the axial lengths of which are proportioned to provide a net eddy current drag torque about the major axis of the gyroscope which is opposite to the friction drag torque imposed on the gyroscope by the register when the spin axis of the gyroscope is normal to said major axis.

8. A gyroscopic integrating device comprising a gyroscope rotor supported by a gimbal for movement about a minor axis perpendicular to the spin axis of the rotor and about a major axis perpendicular to said minor axis, said axes intersecting at a center of suspension, input means for applying a signal torque about said minor axis to cause said gyroscope to precess about its major axis, a register driven in accordance with precessional movement of said gyroscope, magnetic means driven by said rotor to produce a rotating magnetic field concentric with said spin axis, a relatively fixed, cylindrical conductor member concentric with said major axis and arranged in inductive relation with said field to produce eddy current drag torques about said major axis to position said gyro rotor relative to said major axis, said conductor ring being constructed and arranged relative to the center of suspensation of the gyroscope so that when the spin axis of the gyroscope is perpendicular to the major axis a net eddy current drag torque is produced about the major axis in a direction to counterbalance the friction drag torque imposed on the gyro by the register, and a magnetic plug inserted in said conductor member to provide a holding torque about the minor axis of the gyroscope at a predetermined location of the gyroscope about the major axis.

9. A gyroscopic integrating device comprising a gyroscope rotor supported by a gimbal for movement about a minor axis perpendicular to the spin axis of the rotor and about a major axis perpendicular to said minor axis, input means for applying a signal torque about said minor axis to cause said gyroscope to precess about its major axis, a register driven in accordance with precessional movement of said gyroscope, magnetic means driven by said rotor to produce a rotating magnetic field concentric with said spin axis, and a relatively fixed cylindrical conductor member concentric with said major axis and arranged in inductive relation with said field to produce eddy current drag torques about said major axis, said conductor member being formed to provide two spaced concentric ring-shaped sections, and a radially adjustable magnetic plug disposed in said conductor member between said sections for providing a holding torque about said minor axis when the gyroscope is located in a predetermined position about said major axis.

10. A gyroscopic device comprising a gyroscope rotor mounted for rotation about the spin axis of the rotor, a major axis and a minor axis, means for applying a torque about the minor axis of the gyroscope to cause it to precess about the major axis, leveling means for maintaining the spin axis of the gyroscope approximately normal to the major axis, and holding means arranged to apply a torque about the minor axis when the gyro rotor precesses to a predetermined position about the major axis.

References Cited in the file of this patent

UNITED STATES PATENTS

| | | |
|---|---|---|
| 2,406,845 | Moore | Sept. 3, 1946 |
| 2,450,320 | Wendt | Sept. 28, 1948 |
| 2,585,693 | Sinks et al. | Feb. 12, 1952 |